Nov. 1, 1932.  G. A. RICKS  1,885,765
PICK-UP AND RELEASE DEVICE FOR AIRCRAFT
Filed Feb. 28, 1929   2 Sheets-Sheet 1
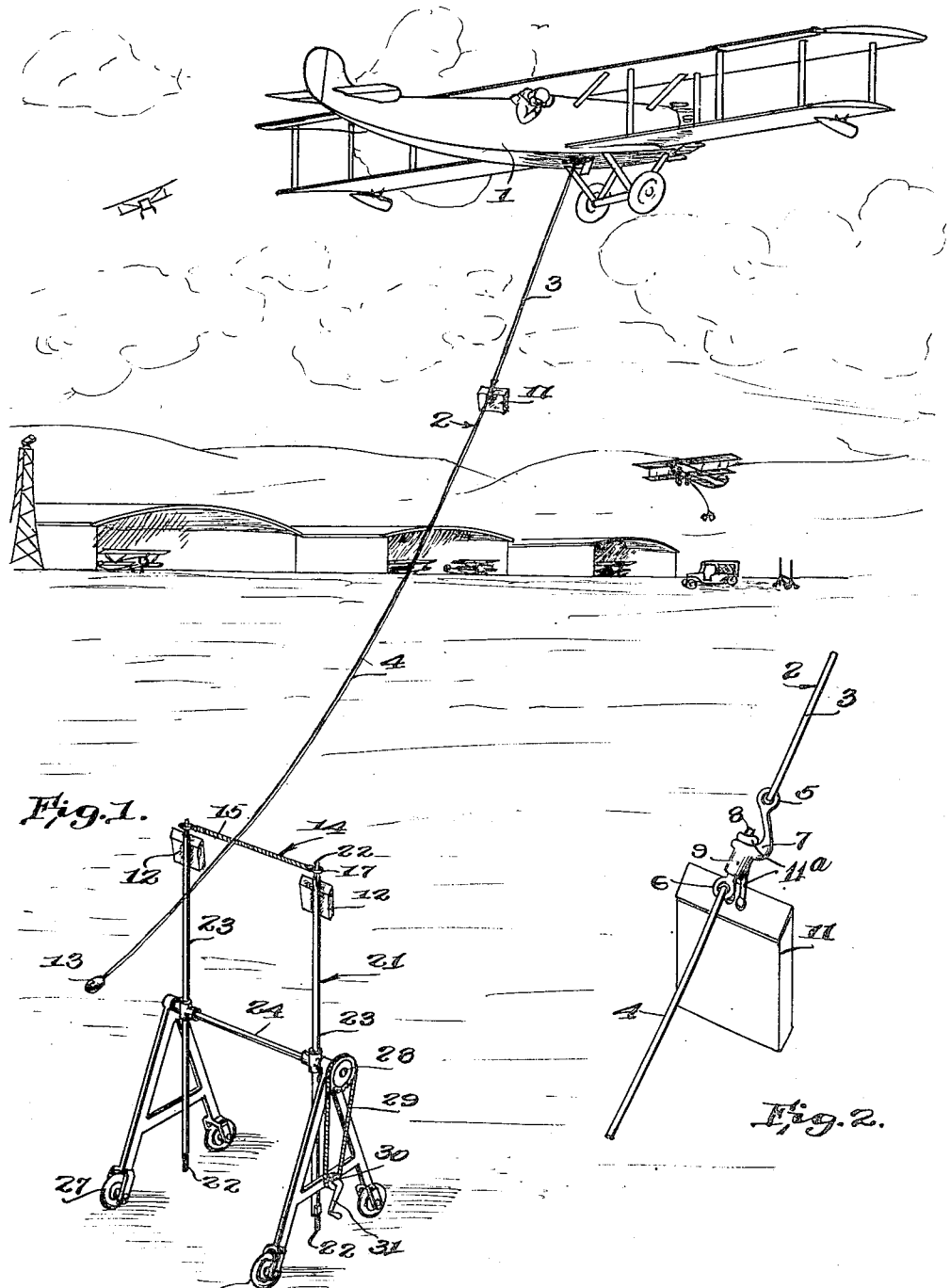
WITNESSES
C. B. Skillinger
J. F. Schrott
INVENTOR
George A. Ricks
BY
Munn & Co.
ATTORNEY

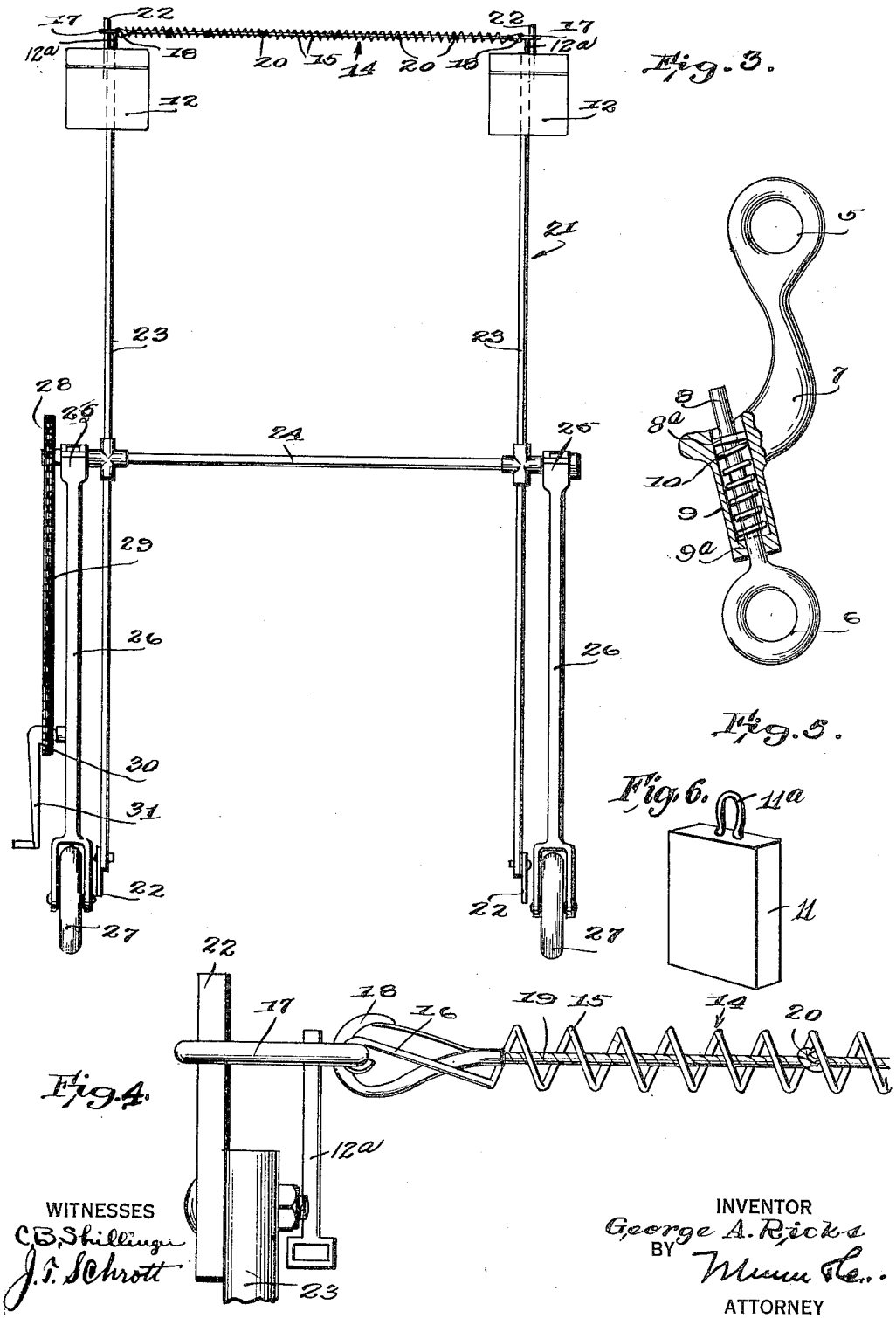

Patented Nov. 1, 1932

1,885,765

UNITED STATES PATENT OFFICE

GEORGE A. RICKS, OF LAFAYETTE, INDIANA

PICK-UP AND RELEASE DEVICE FOR AIRCRAFT

Application filed February 28, 1929. Serial No. 343,328.

This invention relates to improvements in means for the handling or transportation of objects between flying aircraft and the ground, and it consists of the constructions, combinations and arrangements herein described and claimed.

An object of the invention is to make possible the picking up or both the picking up and release of mail bags respecting a designated place on the ground while an aircraft is in flight without necessarily diminishing the speed of the latter or requiring a deviation of the latter from its course other than to fly low enough to establish contact of a certain pick-up rope with the bag holder.

A further object of the invention is to provide means capable of suspension from a moving carrier for picking up certain wanted objects which are stationarily located in relationship to the carrier, and if desirable to do so, cause the dropping of an object from the carrier by virtue of the weight imposed upon the suspended means by the objects which presumably have been picked up.

Other objects and advantages appear in the following specification, reference being had to the accompanying drawings, in which:—

Figure 1 is a perspective view illustrating the general arrangement of the pick-up and release device.

Figure 2 is a detail view of the release device.

Figure 3 is an elevation of the movable frame-work by which the bag holder is carried.

Figure 4 is a detail view particularly showing how one end of the bag holder is attached to the frame-work.

Figure 5 is a detail view of the release hook, the sleeve being shown in section.

Figure 6 is a detail perspective view of the object to be released.

It must be acknowledged that rapidly developing aerial navigation will create an insistently increasing demand for the handling and transportation of matter between the aircraft and the ground and vice versa, without imposing the necessity of the aircraft either making a landing or even materially slowing down. This requirement is becoming particularly urgent by the demands for the delivery and receipt of matter to and from places that are isolated so far as the ability of the aircraft to land is concerned.

In other words, adequate landing fields are not so plentiful that an aircraft can make repeated stops for the receipt and delivery of certain matter, but regardless of this it is a fundamental purpose of the invention to make possible these interchanges of matter without requiring the aircraft to come to a stop. Obviously this facility makes for efficiency in operation, because the aircraft has only to fly low enough that its suspended pick-up rope may reach that element herein known as the bag holder to take up whatever may be attached thereto, and by the same operation to drop whatever may be intended for the locality.

Attention is directed to the drawings. The aircraft is designated at 1. This is herein known as the carrier, and in practice it may constitute any moving carrier although the present disclosure presupposes some kind of an aircraft. It is from this carrier that a pick-up rope 2 is suspended. This may be wound up on a reel to permit convenient letting down and hauling up upon occasion.

The pick-up rope comprises the upper part 3 and lower part 4, the adjoining ends of which are connected to the eyes 5 and 6 of the release hook 7 (Fig. 5). The latter eye forms part of a detent in this instance comprising a pin 8 that rides in the sleeve 9 of the hook, the latter being suitably formed on the inside to accommodate a spring 10 which functions to keep the pin 8 extended as in Figures 2 and 5 but enables the detent to yield when the part 4 of the rope is put under tension.

The pin has a shoulder $8^a$ (Fig. 5) against which one end of the spring 10 presses, the other end of the spring abutting a shoulder $9^a$ in the sleeve 9.

A mail bag 11 or other object to be released and delivered from the aircraft 1 to the ground will be hung upon the hook 7 by means of a hanger $11^a$ which, being flexible, is looped behind the extended pin 8 as clearly shown in Figure 2. When the lower part 4 of the rope 2 is pulled upon, as by virtue of the additional weight of the mail bags 12 to be picked up, the pin 8 will be pulled down flush with the top of the hook 7 permitting the hanger 11ª of the mail bag 11 to be released to slip off and permit the latter to fall to the ground.

Attached to the lower extremity of the lower part 4 of the rope 2 is a weight 13. This is intended to hold the rope suspended when let down from the aircraft. It tends to straighten out the rope, preventing undue lashing about, and in effect stiffening the rope.

The actual pick-up device comprises an element 14 from which the mail bags 12 are suspended. This element is herein known as the bag holder by virtue of its function. It consists of a stout coiled spring 15 which is obviously resilient, the ends 16 of which are connected with rings 17 in common with the hooks 18 at the ends of a rope or other flexible, inelastic element 19 threaded through the convolutions of the spring as plainly shown in Figures 3 and 4.

Knots 20 tied in the rope 19 at intervals of 1 foot (more or less) limit the distance that the rope can slip within the coiled spring 15 after the bag holder 14 has been picked up by the rope 2. The lower part 4 of the latter is intended to catch and bind between convolutions of the spring 15 while passing across the bag holder 14 in the manner suggested in Figure 1 and thus lift the bag holder off of the frame-work 21.

Here a second function of the rope 19 becomes effective. Were it not for the rope the spring 15 would stretch when the bag holder 14 is lifted off of the frame-work. But by virtue of the common connection of the spring and rope with the rings 17 at the ends, the spring will be prevented from stretching any more than desired, and in other words, the rope limits the stretching of the spring.

Studs 22 at the extremities of the parallel bars 23 of a revoluble rack are intended to receive the rings 17 when the bag holder 14 is stretched between them as shown in Figure 3. The revoluble rack includes an axle 24 which is journaled at 25 upon the ground frames 26. The latter have wheels 27 so that the frame-work 21 can be rolled into a suitable delivering position. A sprocket 28 on one end of the axle has a chain connection 29 with a smaller sprocket 30 on a crank 31. The latter is journaled on one of the ground frames, and by turning the crank the revoluble rack will be raised to the position in Figures 1 and 3.

*The operation* is readily understood. For convenience in attaching the mail bags 12 to the frame-work 21 the movable rack is revolved by the crank 31 until one or the other of the sets of studs 22 at the extremities come within reach. The bag holder 14 is applied to these studs by fitting the rings 17 thereover, and in doing so this spring 15 will be stretched sufficiently to open the convolutions. The bags 12 will be suspended from the rings, for example by means of members 12ª (Fig. 4).

Having done this the operator will turn the crank 31 until the revoluble rack is turned to a substantially vertical position, the bag holder 14 being at the highest point. It is possible to balance the revoluble rack so that this position will be maintained. Moreover, there will be enough friction between the various contacting parts in the journals 25 and the sprocket and chain connection to prevent the revoluble rack from toppling over.

It is desirable to leave the revoluble rack reasonably free because when the pick-up rope 2 comes in contact with the bag holder 14 it is desirable that the revoluble rack may be capable of some yielding, the slight forward motion of the rack ensuing upon the contact of the pick-up rope facilitating the lifting off of the latter.

Assuming the pick-up rope to have been caught between the convolutions of the spring 15 the bag holder 14 will be lifted off. Undue stretching of the spring 15 is prevented by the limiting rope 19. Without this rope this spring would stretch excessively. However, the rope provides a definite limit for this stretch, and being knotted at one foot intervals can only slip the distance between any two knots. This makes it possible for the suspended pick-up rope 2 to come in contact with the bag holder 14 at any angle or at any place along its horizontal length with a positive result.

Should it be desired to drop a mail bag 11 from the aircraft 1 at the same time that the mail bags 12 are picked up, the bag 11 will be attached to the release hook 7 in the manner shown in Figure 2. As previously stated, the bag 11 is hung upon the hook 7 behind the pin 8 (Fig. 2). The suspension of the weight of the mail bags 12 will produce a pull on the lower part 4 of the rope 2, draw the pin 8 back and let the bag 11 loose.

While the construction and arrangement of the improved pick-up and release device is that of a generally preferred form, obviously modifications and changes may be made without departing from the spirit of the invention or the scope of the claims.

I claim:

1. An extended holder to which an object is attachable being formed with convolutions, means upon to which the holder is spanned in a receiving position, and means suspended from a movable carrier to sweep across the holder and catch in the convolutions at any point and lift the holder from said foregoing means.

2. A relatively stationary frame-work, a coiled spring applied to the frame-work and having an object attachable thereto, and means suspended from a movable carrier sweeping across the coiled spring to catch and bind between certain convolutions thus to lift the coiled spring and its attached object off of the frame-work.

3. A relatively stationary frame-work, a coiled spring by which an object is supportable being stretched and applied to the frame-work to hold the object in a receiving position, and flexible means suspended from a movable carrier sweeping across the spring to catch and bind between certain convolutions and lift the spring off of the frame-work.

4. A holder to which an object is attachable, means to which the holder is applied in a receiving position, a hook to which a second object is applied having a spring-extended pin to support said second object in a delivering position, and a rope suspended from a movable carrier being divided into upper and lower parts respectively connected with the hook and pin, and being subject to a pull when the lower part engages and lifts the holder thus to retract the pin and drop the second object.

5. A holder comprising a coiled spring to which an object is attachable, a frame-work upon which the spring is stretched in a receiving position, means suspended from a movable carrier to sweep across the spring and catch in the convolutions to lift the holder, and means to limit the stretching of the spring under the weight of the object imposed thereupon.

6. A holder comprising a coiled spring to which an object is attachable, a frame-work upon which the spring is stretched in a receiving position, means suspended from a movable carrier to sweep across the spring and catch in the convolutions to lift the holder, and means to limit any slipping of the holder relative to the suspended means.

7. A holder comprising a coiled spring to which an object is attachable, means upon which the spring is stretched in a receiving position, means suspended from a movable carrier to sweep across the spring and catch in the convolutions to lift the holder, and a flexible element associated with the spring limiting the stretching of the spring under the weight of the object imposed thereupon.

8. A holder comprising a coiled spring to which an object is attachable, means upon which the spring is stretched in a receiving position, means suspended from a movable carrier to sweep across the spring and catch in the convolutions to lift the holder, a flexible element associated with the spring limiting the stretching of the spring under the weight of the object imposed thereupon, and means incorporated in the flexible element at intervals limiting the slipping of said element to the distance between said last means and making it possible for said suspended means to strike and grip the holder anywhere throughout its length.

9. Means suspended from a movable carrier for picking up an object, a holder to which the object is attachable, a rack to which the holder is applied in a receiving position, a frame upon which the rack is horizontally revoluble, and means for revolving the rack until it assumes a substantially vertical position.

10. A holder comprising a coiled spring and a rope threaded through the convolutions of the spring, rings to which the ends of the spring and rope have common connection, said rope limiting the expansion of the spring, and a frame-work having studs upon which the rings can be slipped to support the holder in a receiving position.

11. A pick-up device for a moving craft comprising a resilient holder to which an object is attachable and supporting means to which the holder is temporarily attached by stretching.

12. A resilient holder, supporting means to which the holder is attached in a receiving position by stretching, and rings at the end of the holder providing couplings for the holder to the supporting means and for an object to be picked up.

13. A pick-up device for a moving craft comprising a resilient holder, supporting means to which the holder is temporarily attached by stretching, rings at the end of the holder to be slipped onto the supporting means and to provide a coupling for an object to be picked up, and an inelastic element connecting the rings to limit the stretching of said resilient means.

Signed at Lafayette in the county of Tippecanoe and State of Indiana this 6th day of February A. D. Nineteen hundred twenty-nine.

GEORGE A. RICKS.